United States Patent [19]
Ahn

[11] Patent Number: 5,887,622
[45] Date of Patent: Mar. 30, 1999

[54] VALVE ASSEMBLY OF A COMPRESSOR

[75] Inventor: Chi-Young Ahn, Incheon, Rep. of Korea

[73] Assignee: Daewoo Electronics Co., Ltd., Rep. of Korea

[21] Appl. No.: 896,506

[22] Filed: Jun. 6, 1997

[51] Int. Cl.[6] .................................................. F16K 15/16
[52] U.S. Cl. ........................................ 137/856; 137/857
[58] Field of Search .................................. 137/855, 856, 137/857, 858

[56] References Cited

U.S. PATENT DOCUMENTS

| | | | |
|---|---|---|---|
| 4,524,806 | 6/1985 | Romer | 137/856 |
| 4,723,896 | 2/1988 | Fritchman | 137/856 |
| 5,140,748 | 8/1992 | Kandpal | 137/855 |
| 5,178,183 | 1/1993 | Kim | 137/857 X |
| 5,209,260 | 5/1993 | Baek | 137/857 X |
| 5,676,533 | 10/1997 | Park | 137/857 |

*Primary Examiner*—Denise L. Ferensic
*Assistant Examiner*—Ramyar Farid
*Attorney, Agent, or Firm*—Cushman Darby & Cushman Intellectual Property Group of Pillsbury Madison & Sutro, LLP

[57] ABSTRACT

A valve assembly is comprised of a valve plate 35, a discharge valve 34, a backing valve 33, and a stopper 31. A first fixed member 34H of the discharge valve 34 and second fixed member 33H of the backing spring 33 have a first slot 43 and a second slot 42 for receiving a projection 44 formed on the supporting surface 37S, respectively. The stopper 31 comprises a first pressing member 31H which enables the first fixed member 34H of the discharge valve 34 and second fixed member 33H of the backing spring 33 to be pressed in a supporting surface 37S of the accommodating space 37. The embossing portion 36 is pressed by the lower surface of the valve plate 101.

4 Claims, 6 Drawing Sheets

VALVE ASSEMBLY OF A COMPRESSOR

BACKGROUND OF THE INVENTION

1. Field of the Invention

The present invention relates to a valve assembly of a compressor, and more particularly to a valve assembly having a projection receiving the respective fixed ends of each discharge valve and backing spring.

2. Description of the Prior Art

A compressor is a device for converting the mechanical energy of compressible fluid into the compression energy of fluid. The conventional types of compressors are classified into reciprocating, rotating, and turbo models. When such a compressor is used in a refrigerator, saturated vapor having a low boiling point is converted into a high pressure state and thereafter the vapor proceeds to a condenser. For a refrigerator, the inside of the refrigerator is utilized as a cold source while the outside of the refrigerator is utilized as a hot source. In the condenser, refrigerant having high temperature and pressure emits its potential heat to the outside. The liquid phase refrigerant is transformed, via an expansion tube, into the refrigerant having low temperature and pressure in which the refrigerant then moves into an evaporator. Most of the refrigerant having low temperature and pressure absorbs the latent heat from the cold source, i.e., the inside of the refrigerator, and the refrigerant liquid phase is changed to the gaseous phase. The gaseous refrigerant flows into the compressor, the course of which comprises a refrigerating cycle. During the cycle the inside of the refrigerator constantly receives cool air, thereby achieving the required refrigerating effect.

A compressor used in a conventional household refrigerator is comprised mainly of a single stage reciprocating type. The compressor has an electric power driven motor in its housing and is installed at the lower portion of the refrigerator. The typical compressor is shown in FIGS. 3 and 4.

The compressor 10 comprises a lower case 11 and an upper case 12, in which a driving member AA and a compressing member BB are housed. A frame 24 is disposed between the driving member AA and the compressing member BB. The compressing member BB comprises a cylinder block 13 mounted on the frame 24 and a piston 14 disposed reciprocally in the cylinder block 13. By the reciprocating movement of the piston 14, refrigerant having low temperature and pressure is taken in or discharged through a valve assembly 15 disposed at the left end of the cylinder block 13 (FIG. 4). The valve assembly 15 comprises a suction valve and a discharge valve, which both constitute an elastic flapper or reed form to reduce the size of the valve assembly. The valve assembly is passively operated by the difference of pressure applied to both opposite surfaces of the valve plate.

In the reciprocating compressor, during the backward (direction of arrow A in FIG. 4) movement of the piston 14, the refrigerant having low temperature and pressure is sucked from an evaporator (not shown) into the valve assembly 15 via a suction pipe 22 and a suction muffler 16 which are sealedly attached on the upper case 12 and the lower case 11. During the forward (direction of arrow B in FIG. 4) movement of the piston 14, the refrigerant having high temperature and pressure is discharged from the valve assembly 15 via a discharge muffler 17 to a discharge pipe 23 which is sealedly attached on the lower case 11, thereby finally moving to the condenser (not shown). A refrigerant charge pipe 22' is sealedly mounted on the lower case 11 and is sealed after filling with refrigerant from the onset of production of the compressor.

However, noise of the compressor which is a major problem during the operation of refrigerator is generated from the reciprocating movement of the piston 14, shock of a closing or opening operation of the valve assembly 15, and pulsation of intaking or discharging pressure of the refrigerant, etc. Especially, since the refrigerant discharged from the small diameter pipe 22 stays in the voluminous inside of the cases (11,12) for a moment, the noise caused by the pulsation of the refrigerant. The refrigerant is intaken into the cylinder 13 through the intake muffler 16, and thus the compressed refrigerant is discharged to the discharge pipe 23 via the discharge muffler 17.

The driving member AA comprises a stator 18 installed under the frame 24 and a rotor 19 spaced from the stator 18. The rotor 19 is fixedly provided on the rotating shaft 20 which is rotatably mounted to the frame 24. At the upper end of the shaft 20 an eccentric shaft 21 is formed, which is connected to the piston 14 via both a bearing (not shown) and a connecting rod 14R. The piston 14 moves reciprocatingly within a predetermined distance, i.e., twice the eccentric distance. Further, a winding coil (not shown) connected to the stator 18 is housed in an external terminal box 18' which is sealedly mounted to the lower cases 11 through the box in which an external power source is applied.

For easier operation of the conventional compressor assembly constructed as above, an oil reservoir 25 is provided at the bottom of the lower case 11 for containing the oil. The oil is taken in through a duct or oil pump 20' extended within the shaft 20 up to the upper portion of the shaft, thereby achieving a lubrication system.

FIGS. 5 and 6 illustrate one embodiment of the conventional flapper discharge valve assembly. The valve assembly is comprised of a plate or valve member 110, a discharge valve 123, a backing spring 122, a stopper 121, and an intake suction valve 106. A detailed description of the structure and the operation of the parts described above in the valve assembly are disclosed in U.S. Pat. No. 5,209,260. The plate member 110 has a stepped recess comprising an outer surface 111, an inner surface 112, and a supporting surface 113. The discharge valve 123, the backing spring 122, and the stopper 121 are accommodated in the recess formed in multiple steps.

Furthermore, since both ends of the stopper 121 are elastically placed on the outer surface 111 and the stopper is confined by the bottom surface of a cover 101, the stopper 121 may fit loosely. The backing spring 122 and the discharge valve 123 are not elastically held in their place. Therefore, stability or reliability for closing/opening the valve is decreased. That causes a problem because noise and vibration occur so the operational life of the valve is shortened. Additionally, U.S. Pat. No. 5,178,183 illustrates the above problem of a loose fitting stopper.

Moreover, as shown in FIG. 4, since the steel material utilized is elastic and each slot formed at both ends of the stopper 121 is about 1 mm in width, an accurate sharp punch is necessary in the press operation. That causes frequent reshaping work of a worn-out punch, thereby resulting in a problem of low productivity.

SUMMARY OF THE INVENTION

Therefore, it is an object of the present invention to provide a valve assembly of a compressor for improving the efficiency of the compressor by lessening the volume of the discharge passage using a simple construction.

It is another object of the present invention to provide a valve assembly of a compressor for improving an assemblity and an opening/closing operability of a valve.

In order to achieve the above objects of the present invention, a valve assembly of a compressor comprises: a valve plate forming therein an accommodating space having a projection and a valve port; a discharge valve having a first fixed member including a first slot in which the projection penetrates one end of the discharge valve, and having a first free end for covering the valve port at the other end thereof; a backing spring placed above the discharge valve, and having a second fixed member including a second slot at one end of the backing spring and having a second free end at the other end thereof for restricting a closing/opening of the first free end of the discharge valve; a stopper having a first pressing member which presses the first and second fixed members, the first pressing member having an embossing portion for receiving the projection and having a second pressing member which makes contact with the second free end of the backing spring; and a cover member for blanketing the stopper, and making contact with the valve plate.

The upper surface of the embossing portion of the stopper makes contact with the lower surface of the cover member.

Further, one portion of the first pressing member makes contact with the lower surface of the cover member and the other portions of the first pressing member make contact with the bottom surface of the accommodating space.

A circumference of the accommodating space is asymmetrical.

Further, a portion of each circumference of the respective discharge valve, backing spring, and stopper corresponds to the asymmetrical section of the accommodating space circumference.

BRIEF DESCRIPTION OF THE DRAWINGS

The above objects and other advantages of the present invention will be more clarified by describing a preferred embodiment thereof with reference to the accompanying drawings in which.

DESCRIPTION OF THE PREFERRED EMBODIMENT

The preferred embodiment of the present invention will now be described in detail with reference to the accompanying drawings.

Figure 1:
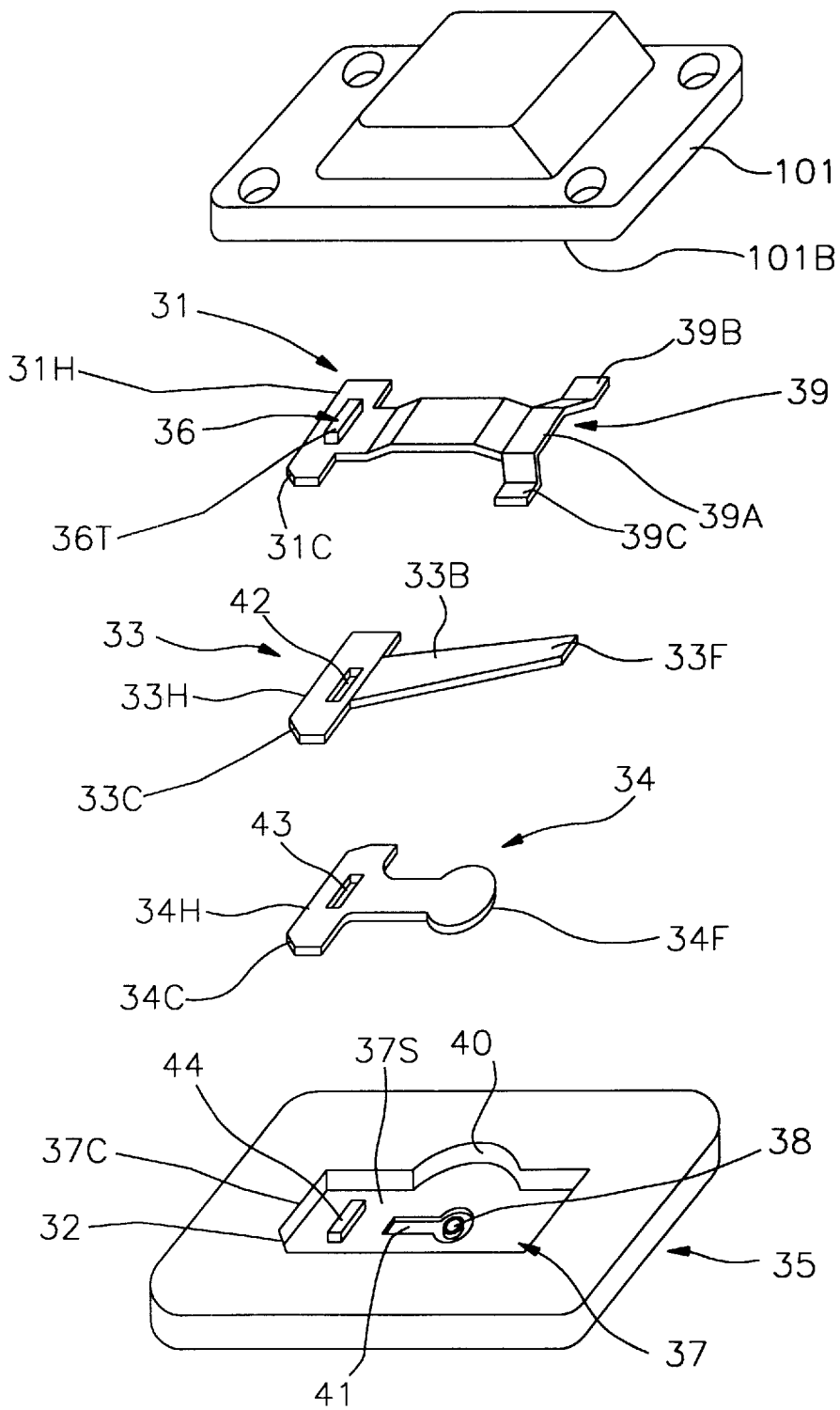
FIG. 1 is an exposed perspective view of a valve assembly according to the present invention.
Figure 2:
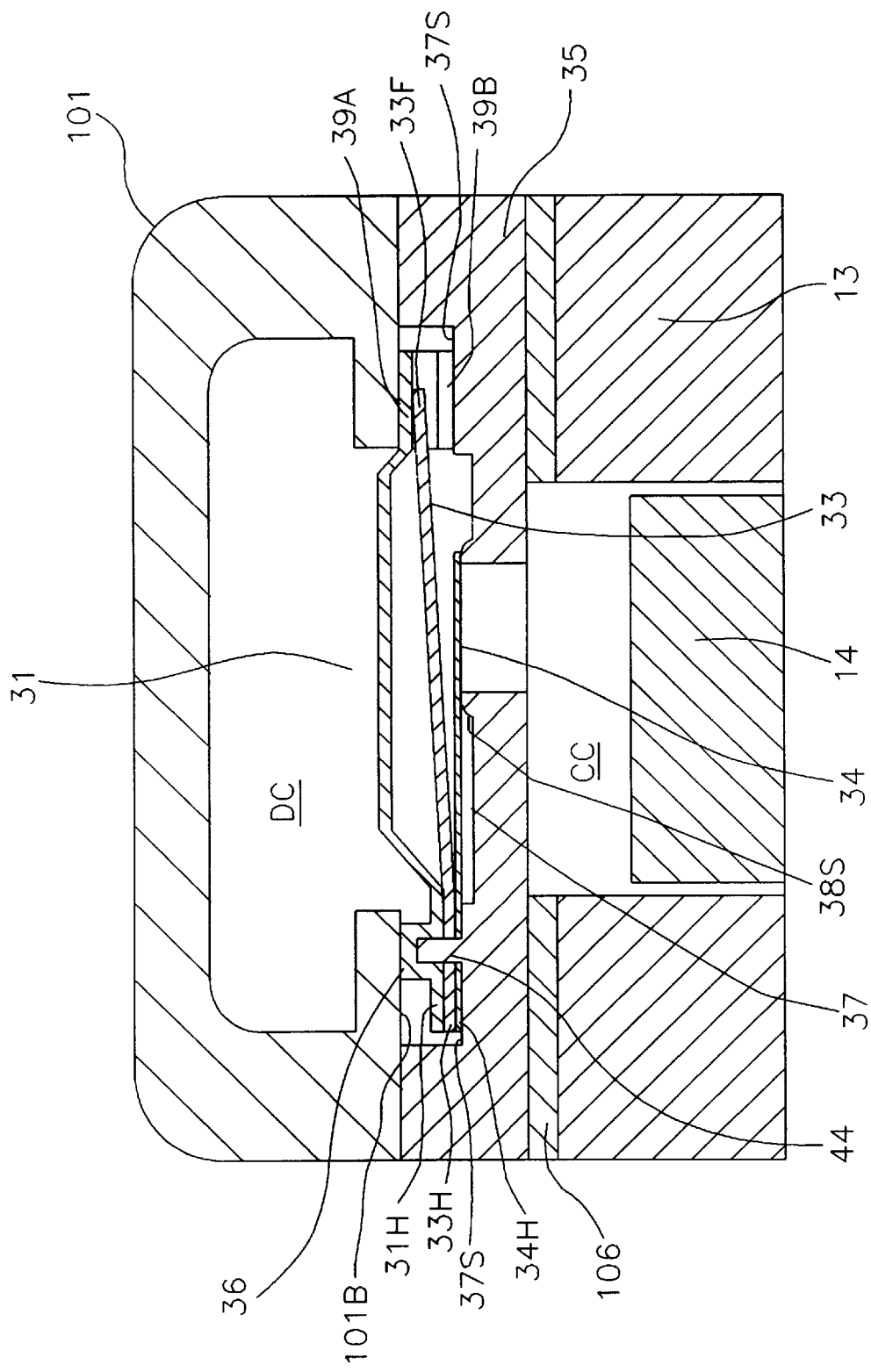
FIG. 2 is a vertical elevational view of a valve assembly mounted on a upper end of a cylinder according to the present invention.
Figure 3:
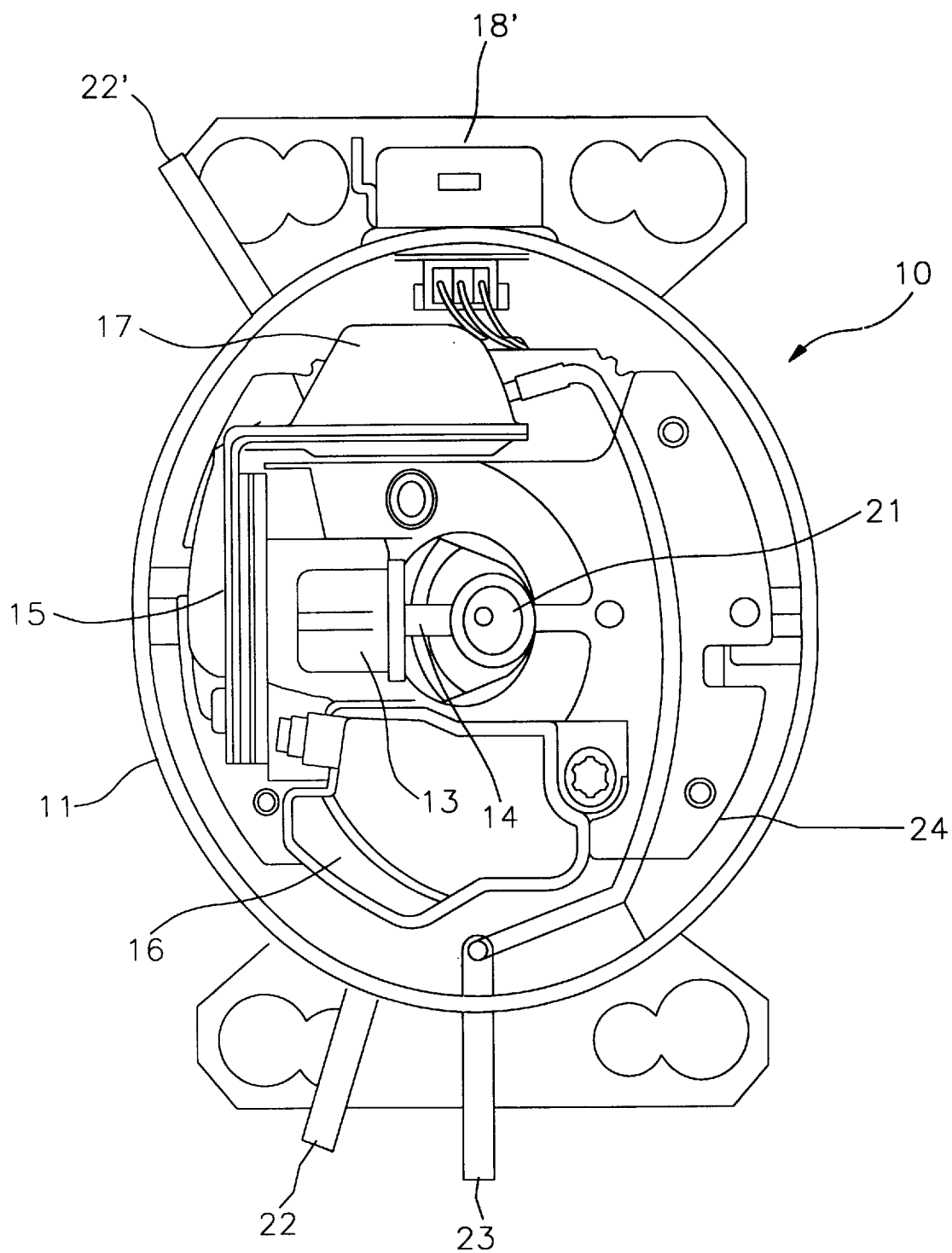
FIG. 3 is a plan view of a compressor showing a valve assembly with the compressor cover removed according to a prior art.
Figure 4:
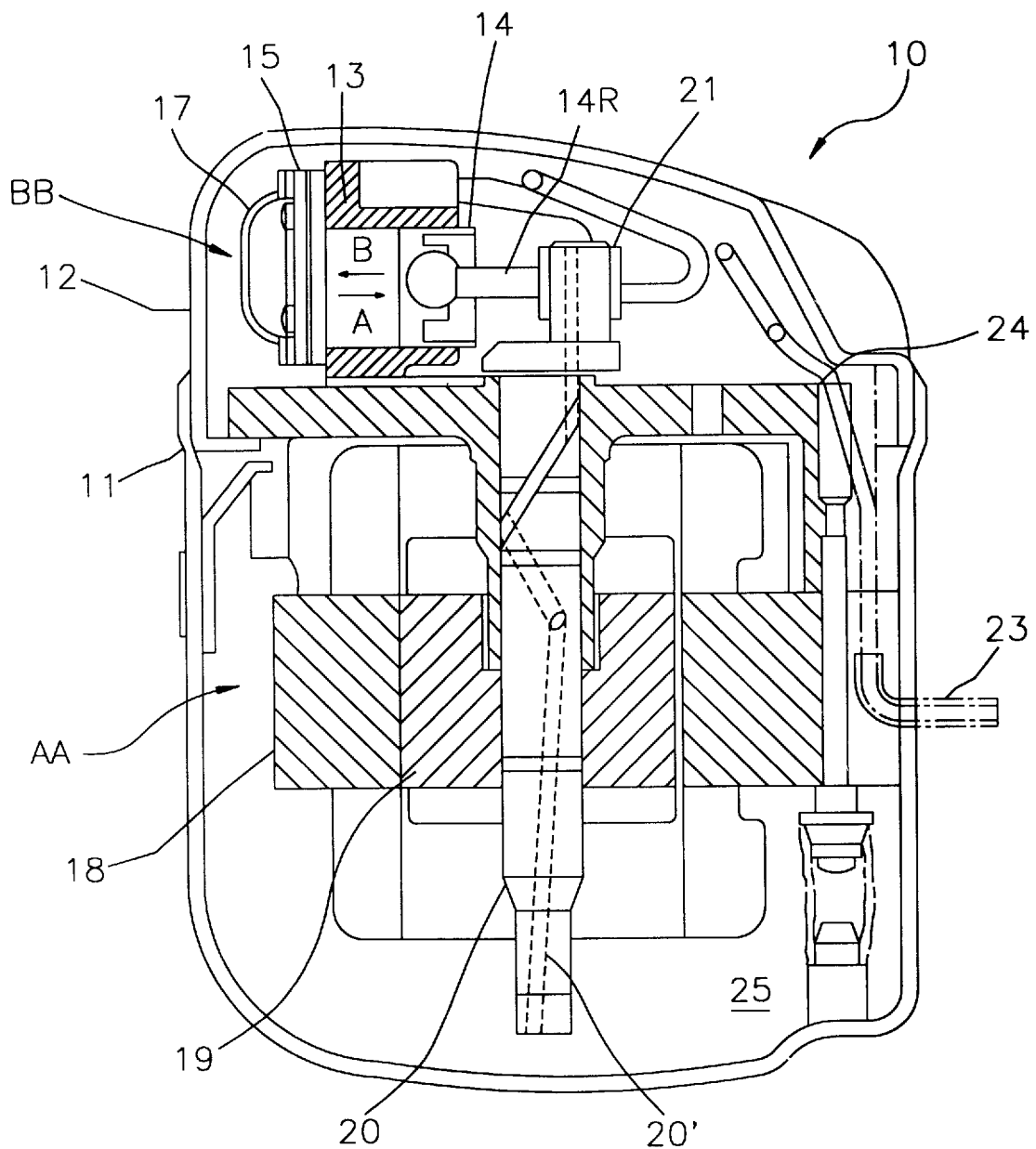
FIG. 4 is a vertical elevational view of a compressor according to a prior art.
Figure 5:
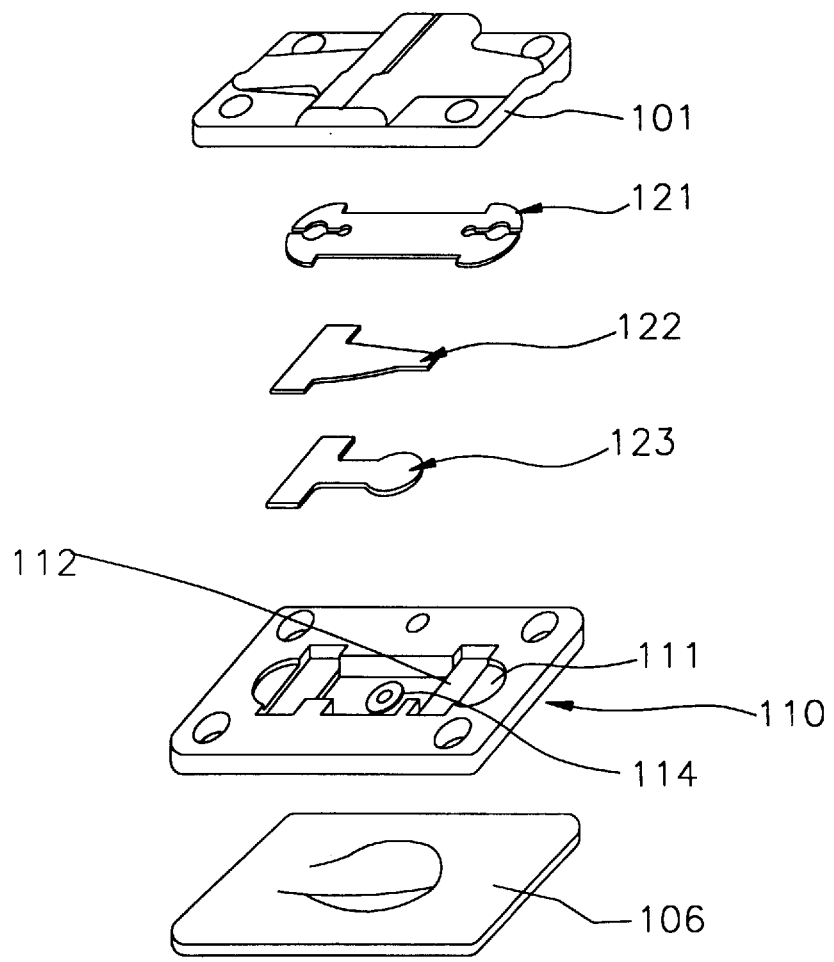
FIG. 5 is an exposed perspective view of a valve assembly according to a prior art.
Figure 6:
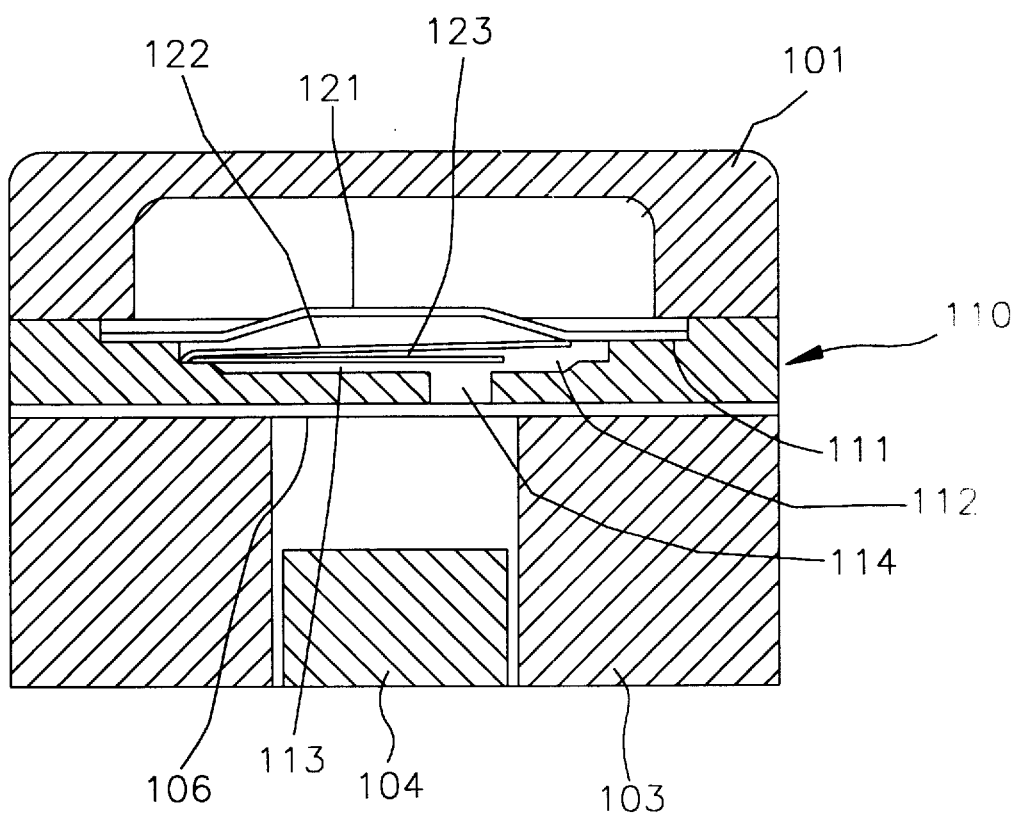
FIG. 6 is a vertical elevational view of a valve assembly mounted on a upper end of a cylinder according to a prior art.

FIGS. 1 to 2 show a valve assembly of a compressor according to the present invention. Hereafter, components which are the same as that of the prior art are designated by the same numerals. Thus, no detailed explanation of those components will be provided.

The valve assembly is comprised of a valve plate 35, a discharge valve 34, a backing spring 33, and a stopper 31. The plate 35 is sealedly placed on the cylinder 13 as shown in FIG. 2 and has a valve port 38 interconnecting a chamber CC of the cylinder 13 with a discharge chamber DC confined by a cover 101. A recess 41 is formed around the valve port 38 of the upper surface of the plate 35. An accommodating space 37 is further formed around the recess 41.

In the accommodating space 37 the discharge valve 34 and the backing spring 33, above which the stopper 31 is placed, are provided.

The upwardly bowed backing spring 33 is placed over the discharge valve 34 to restrict the opening degree of the discharge valve 34, so the rapid closing of the valve 34 is possible.

A valve seat 38S is formed at the periphery of the upper end of the discharge passage or valve port 38 for providing a sealable closing of the discharge valve 34. The height of the valve seat 38S is the same as that of supporting surface 37 which will be described later. That is, the valve seat 38S is coplanar with the supporting surface 37S so that the discharge valve 34 is able to efficiently close/open the discharge passage 38.

Further, the accommodating space 37 has a sloped wall 40 near the discharge passage 38 for providing the smooth discharge of the gas through the discharge passage 38. Also, in the accommodating space 37, on a supporting surface or a bottom surface 37S a projection 44 which is protruded uprightly is provided. Furthermore, an asymmetrical portion 32 is provided at one area of a circumference 37C which is formed along the edge of the accommodating space 37 of the valve plate 35.

In the discharge valve 34, one end thereof has a first fixed member 34H which includes a first slot 43 in which the projection 44 penetrates one end of the discharge valve 34. The end of the discharge valve 34 has a first free end 34F which covers the valve port 38. Furthermore, an asymmetrical portion 34C is provided at one area of a circumference of the discharge valve 34 which corresponds to the asymmetrical portion 32 of the accommodating space circumference 37C.

The backing spring 33 is placed above the discharge valve 34 and has a second fixed member 33H including a second slot 42 at one end of the backing spring 33 and has a second free end 33F at the other end thereof for restricting a closing/opening or an up-down movement of the first free end 34F of the discharge valve 34. Furthermore, an asymmetrical portion 33C is provided at one area of a circumference of the backing spring 33 which corresponds to the asymmetrical portion 32 of the accommodating space circumference 37C.

A bridge portion 33B for connecting the second fixed member 33H with the second free end 33F gradually narrows in width from the second fixed member 33H toward the second free end 33F. The backing spring 33 is so shaped not to interrupt the easy discharge of the gas from the discharge passage 38.

The stopper 31 is formed as a longitudinal cross-sectional humpbacked bridge. One end of the stopper 31 has a first pressing member 31H which presses the second fixed member 33H of the backing spring 33 and the first fixed member 34H of the discharge valve 34. The first pressing member 31H includes an embossing portion 36 for receiving the penetrated projection 33 through the first slot 43 and the second slot 42. The upper surface 36T of the embossing portion 36 makes contact with the lower surface 101B of the cover member 101. The other end of the stopper 31 has a second pressing member 39 which includes one portion 39A for making contact with the lower surface 101B of the cover member 101 and the other portions 39B,39C for making contact with the bottom surface 37S of the accommodating surface 37. Furthermore, an asymmetrical portion 31C is provided at one area of a circumference of the stopper 31 which corresponds to the asymmetrical portion 32 of the accommodating space circumference 37C.

The operation of the device of the present invention constructed as illustrated above will now be described as follows.

The discharge valve 34 is housed in the accommodating space 37 with the first slot 43 inserted through the projection 44. The backing plate 33 is placed above the discharge valve 34 with the second slot 42 inserted through the projection 44. The stopper 31 is placed above the backing plate 33 with the embossing portion 36 blanketing the projection 44, thereby achieving the assembling process of the valve assembly. The gas pressure in the chamber CC of the cylinder 13 is increased during the upward movement or compression mode of the piston 14. The discharge valve 34 placed on the valve seat 38S is upwardly pushed as the pressurized gas is discharged through the discharge port or valve port 38. Since both the first fixed member 34H of the discharge valve 34 and the second fixed member 33H of the backing spring 33 are pressed by the first pressing member 31H of the stopper 31 on the supporting surface 37S of the valve plate 35, the free end 34F of the valve 34 moves upwardly. The movement of the valve 34 is restricted when the free end 34F of the valve 34 makes contact with the lower surface of the backing spring 33. The continuous upward movement of the free end 34F causes the upward movement of the backing spring 33.

During the upward movement of the backing spring 33, since the second fixed member 33H of the backing spring 33 is pressed by the first pressing member 31H on the supporting surface 37S of the accommodating member 37, the second fixed member 33H does not upwardly move any more, but rather only the free end 33F can move which contacts freely with the one portion 39A of the stopper 31. Since the bridge portion 33B, on which the free end 34F of the discharge valve 34 is contacted, is bowed upwardly, the second free end 33F is pulled toward the bridge portion 33B. Therefore, the second free end 33F slides on the lower portion of the one portion 39A of the stopper 31.

Since the first pressing member 31H pressed by the lower surface 101B of the valve plate 101 tightly secures the backing spring 33 and the discharge valve 34 in place, the backing spring 33 and the discharge valve 34 are stably mounted on the supporting surface 37S. Thus, noise and vibration can be reduced and life of the valve is prolonged. Moreover, the stopper need not be made of a thin and slit part like the prior art, but a wide selection such as elastic material can be adapted to improve the productivity.

On the other hand, refrigerant discharged from the valve port 38 passes over the sloped wall 40 formed at the wall of the accommodating space 37 and smoothly goes out the accommodating space 37. Further, the refrigerant passes over the vicinity of the bridge portion 33B of the backing spring 33 which is offset from the center of the valve port 38, thereby providing no resistance to the upward movement of the refrigerant. Little resistance occurs for the flow of the refrigerant passing by the accommodating space 37.

The compressor of the present invention can prevent slippage of the discharge valve and the backing spring from the valve plate while being operated, since the discharge valve and the backing spring are fixed to the valve plate by a rivet. Further, any misassembly is prevented by providing different widths of both ends of the backing spring, and the refrigerant is smoothly discharged owing to the sloped wall which is provided at the accommodating space of the valve plate. Further, no interference of the upward movement of refrigerant occurs due to a slight part of the bridge portion of the backing spring that covers the valve port.

What is claimed is:

1. A valve assembly of a compressor for intaking or discharging a working fluid by reciprocation of a piston comprising:

a valve plate forming therein an accommodating space having a projection and a valve port;

a discharge valve having a first fixed member including a first slot in which said projection penetrates one end of said discharge valve, and having a first free end for covering said valve port at the other end thereof;

a backing spring placed above said discharge valve, and having a second fixed member including a second slot at one end of said backing spring and having a second free end at the other end thereof for restricting a closing/opening of said first free end of said discharge valve;

a stopper having a first pressing member which presses said first and second fixed members, said first pressing member having an embossing portions, for receiving and covering said projection, and a remaining portion, and said stopper having a second pressing member which makes contact with said second free end of said backing spring, said stopper having a middle portion connecting said first and second pressing members, and the upper surface of said embossing portion of said stopper being contacted with the lower surface of said cover member, wherein the remaining portion of the first pressing member is spaced from the cover; and a cover member for blanketing said stopper, and making contact with said valve plate.

2. The valve assembly of a compressor as claimed in claim 1, wherein one portion of said second pressing member makes contact with the lower surface of said cover member and other portions of said second pressing member opposite to said one portion of said second pressing member make contact with the bottom surface of said accommodating space.

3. The valve assembly of a compressor as claimed in claim 1, wherein a circumference of said accommodating space is asymmetrical.

4. The valve assembly of a compressor as claimed in claim 3, wherein part of each circumference of the respective discharge valve, backing spring and stopper corresponds to the asymmetrical section of said accommodating space circumference.

* * * * *